United States Patent [19]

Ferrarini et al.

[11] 4,073,828

[45] Feb. 14, 1978

[54] ETHYLENICALLY UNSATURATED MONOMER SOLUTIONS CONTAINING URYLATED LINEAR POLYESTER/POLYURETHANE RESINS

[75] Inventors: James Ferrarini, Aston, Pa.; Erich Kuehn, Wilmington, Del.

[73] Assignee: ICI Americas Inc., Wilmington, Del.

[21] Appl. No.: 676,531

[22] Filed: Apr. 12, 1976

[51] Int. Cl.$^2$ ............................................. C08L 75/00
[52] U.S. Cl. .......................... 260/859 R; 260/40 R; 260/835; 260/836; 260/837 R; 264/294
[58] Field of Search .................................. 260/859 R

[56] References Cited

U.S. PATENT DOCUMENTS

| | | | |
|---|---|---|---|
| 3,377,406 | 4/1968 | Newey | 260/837 R |
| 3,509,234 | 4/1970 | Burlant | 260/859 R |
| 3,641,199 | 2/1972 | Niederhauser | 260/859 R |
| 3,644,569 | 2/1972 | Pietsch | 260/859 R |
| 3,859,381 | 1/1975 | Hutchinson | 260/859 R |
| 3,868,431 | 2/1975 | Hutchinson | 260/859 R |
| 3,886,229 | 5/1975 | Hutchinson | 260/859 R |
| 3,893,956 | 7/1975 | Brandt | 260/859 R |
| 3,962,370 | 6/1976 | Hutchinson | 260/859 R |
| 3,994,764 | 11/1976 | Wolinski | 260/859 R |
| 3,997,490 | 12/1976 | Matsuda | 260/859 R |

FOREIGN PATENT DOCUMENTS

| | | | |
|---|---|---|---|
| 1,239,701 | 7/1971 | United Kingdom | 260/859 R |
| 1,393,782 | 5/1975 | United Kingdom | 260/859 R |

*Primary Examiner*—Paul Lieberman

[57] ABSTRACT

Ethylenically unsaturated monomer solutions are thickened to moldable gels by the formation of homogeneous urylene-linked linear saturated polyester/polyurethane resin mixtures. These are made by the addition of certain diamines to monomer solutions containing isocyanate terminated polyester/polyurethane resins. These gels exhibit improved laminar flow characteristics at moderate molding temperatures and pressures and retain these flow characteristics even when they contain as high as 80 percent concentrations of a filler such as 1-inch fiber glass filaments.

29 Claims, No Drawings

ETHYLENICALLY UNSATURATED MONOMER SOLUTIONS CONTAINING URYLATED LINEAR POLYESTER/POLYURETHANE RESINS

This invention is directed to ethylenically unsaturated monomer solutions of urylene-linked saturated polyester/polyurethane resins which are suitable for casting and molding. In particular it is directed to gelled vinylidene solutions of ethylenically unsaturated polyesters employing a urylene-linked linear polyester/polyurethane resin free of ethylenic unsaturation as the gelling or thickening agent. It is also directed to a process for forming these gelled solutions wherein an organic diamine is added to an -NCO terminated linear polyester/polyurethane prepolymer dissolved in the ethylenically unsaturated monomer solution. Furthermore, it is directed to gelled ethylenically unsaturated copolymer resin systems which can be molded and cured at moderate temperatures and pressures to form completely cured sheets and low profile or deep-drawn reinforced components having filler contents as high as 80 percent having superior tensile and flexural strength.

Molding compositions employing ethylenically unsaturated polyesters and vinylidene monomers have been thickened by the addition of such inorganic materials as aluminum or magnesium oxides. Gelation takes place rather slowly with the employment of aluminum or magnesium oxides and in some instances requires as many as two or three days to obtain a handleable or moldable composition. When these compositions reach a moldable viscosity, they must be used within a period of a few days or be discarded since the gelation and cross-linking continues to a point where the composition is no longer tractable.

More recently, however, cross-linked polyurethane thickened gels of polyester resin systems have been developed which are an improvement over the metal oxide thickened materials in that they have increased stability and can be maturated to form moldable compositions within a few hours. Such systems, after complete curing, exhibit improved shrinkage characteristics over the cured metal oxide cross-linked and thickened materials. Such resin compositions containing isocyanate terminated polyesters and polyethers are well known in the art and have been well described in U.S. Pat. Nos. 2,806,836; 2,915,493; 3,008,917; 3,371,056; 3,448,171; 3,448,172; 3,509,234; 3,641,199; 3,644,569; 3,700,752; 3,859,381; and 3,886,229. Furthermore, the use of diamine cured isocyanate terminated resins have been described in U.S. Pat. Nos. 3,047,530; 3,290,208; 3,457,326; 3,464,935; and 3,691,265. Only recently, have closely related resin combinations been developed as molding compositions which contain fibrous fillers. For example, U.S. Pat. No. 3,824,201 describes a fiber filled thermosetting resin-containing composition which is especially useful for molding under pressure. The system described comprises a hydroxy terminated unsaturated polyester resin having a hydroxyl functionality between 3.0 and 1.8 and at average molecular weight between 1,000 and 5,000 and which is reacted with a polyisocyanate amounting to about 85–99 percent by weight of that necessary to cause the system to gel in the presence of an unsaturated monomer. Such systems are designed to operate with from 15 to about 35 percent by weight of a fibrous filler or reinforcing agent. When these and the above materials are filled to an extent greater than 50 percent, they become very difficult to extrude at economically reasonable temperatures and pressures. Furthermore, they are difficult to extrude in situations where the flow-out in the mold exceeds 20 percent.

As a result of a world movement to conserve energy and fossil fuel, the automobile industry is striving to reduce the average weight of all newly manufactured vehicles. One way to reduce weight is to switch from metal to lightweight plastic. However, plastics are inherently weak and must be highly reinforced to meet the tensile strength requirements of certain components such as wheels, brackets and structural panels. In order to meet requirements of strength, resins must be reinforced with such materials as glass fiber filaments in high concentrations mostly exceeding 50 percent by weight. The incorporation of large amounts of filler, while producing very strong completely cured polyester resins, are difficult to mold such that the molded articles have uniformly distributed reinforcing materials. In producing molded articles having intricate shapes wherein a preform containing fibrous filler is squeezed between the male/female sections of a mold and the flow-out exceeds 30 percent, it is difficult to obtain a uniformly filled article. Usually resin material flows away from the fibrous filler leaving the article more highly filled in the region of the preform and scantly filled at the mold extremities or locations of maximum flow-out. The molded article, therefore, is weaker in regions containing less filler. Previously this problem was thought to be overcome by forming more complex branch chain intermingled and cross-linked polymer systems which surround individual fibers and thereby cause them to be carried along with the resin as it is squeezed through the complicated mold compartments. These resin systems have a tendency to be thermosetting and, contrary to theory, do not form more uniformly filled molded articles. Surprisingly, therefore, Applicants have found that the employment of a linear thickener which is essentially noncross-linked with the primary resin system tends to move the filler along with the resin more uniformly than those previously known. Applicants have accomplished this by the extension of the thickener chain by forming urylene links with adjacent isocyanate terminated linear polyester chains. The amine/isocyanate reaction takes place at a much faster rate than the isocyanate/carboxyl or isocyanate/hydroxyl reaction and thereby forms a truly separate chain system which is more thermoplastic but, surprisingly and without explanation, tends to permit the formation of uniformly filled molded articles wherein the flow-out approaches 100 percent even with filler concentrations ranging up to as high as 80 percent.

It is an object, therefore, of the present invention to provide novel cross-linked plastics based on unsaturated polyesters and ethylenically unsaturated monomer compounds.

Another object is to provide urylene-linked linear saturated polyester/polyurethane thickened vinylidene monomer solutions containing high concentrations of filler which can be molded at moderate temperatures and pressures wherein 100 percent flow-out is required.

Another object is to provide a process for preparing a novel thickened monomer solution of the invention.

Another object is to provide molded articles of ethylenically unsaturated polyester/vinylidene monomer resins having high filler concentrations.

These and other objects of the invention are accomplished by forming a vinylidene monomer solution containing a linear isocyanate terminated saturated polyester resin having a molecular weight within the range of 500–3000. To this is added an organic polyamine compound which is mostly a diamine which reacts in the absence of catalyst to form urylene-links with the terminal isocyanate groups at temperatures of 20°–100° C. Such systems form gelled materials within a period of 1 minute to 24 hours, and usually within a period of 20 minutes to 1 hour, which are tack-free moldable compositions which undergo slow viscosity increases for a period of about 12 hours and thereafter remain in a moldable storable condition at temperatures up to about 30° C. for months. Preferably, however, the monomer may also have dissolved therein a polyester resin having a molecular weight of 400–4000 and greater and which may include ethylenically unsaturated polyesters, vinyl ester urethanes and vinyl ester polyisocyanurate resins, vinyl ester epoxy resin condensates, or various other ethylenically unsaturated monomeric materials. Preferably, these alternate resins are linear with only limited amounts of branch chains present. In the operation of the invention, best results are obtained when a substantially linear unsaturated polyester resin is thickened with a substantially linear urylated polyester/polyurethane thickener component. It is preferred that cross-linking through ethylenically unsaturated bonds not take place through the activation of the free radical initiating catalyst until the gelled vinylidene monomer/ethylenically unsaturated polyester resin solution has essentially filled the mold cavity.

In the practice of the invention, therefore, essentially three steps are taken to form a molded article:

Step 1 - form a vinylidene monomer solution having dissolved therein an isocyanate terminated linear polyester/polyurethane resin free of ethylenic unsaturation;

Step 2 - gel or thicken the vinylidene monomer solution by intermixing with an organic diamine with sufficient agitation to form a homogeneous mixture; and Step 3 - inject the gelled material into a mold and initiate the polymerization of the vinylidene monomer.

The solutions added at Step 1 or 2 may also contain ethylenically unsaturated resins.

The following vinylidene monomers can be used: styrene, vinyl toluene, divinyl benzene, acrylic acid esters, methacrylic acid esters such as methyl acrylate, ethyl acrylate, n-butyl acrylate, 2-ethyl-hexyl acrylate, methyl methacrylate, pentaerythritol triacrylate, ethylene glycol dimethacrylate, diallyl phthalate, diallyl maleate, diallyl fumarate, triallyl cyanurate, vinyl acetate, vinyl propionate, vinyl ether, acrylonitrile, etc. In general, by vinyl monomer is meant a monomer containing at least one ethylenically unsaturated group which will react with the ethylenically unsaturated group in a polyester or itself.

Ethylenically unsaturated resins which are useful are well known in the art and are prepared by reacting carboxylic acids or their anhydrides with polyhydric alcohols. These have molecular weights ranging from 400–4000 and often 1000–3000. They are prepared using a procedure wherein at least one of the reactive components contains alpha,beta-ethylenic unsaturation. These resins while primarily linear can contain branch chains by the addition of polyols or polycarboxylic acids having more than two functional groups. Usually they contain a plurality of ethylenically unsaturated linkages distributed along the backbones of their polymer chains. The use of alpha,beta-ethylenically unsaturated polycarboxylic acids combines a convenient method of introducing ethylenic unsaturation into the polyester resin. It is preferred to employ alpha,beta-ethylenically unsaturated dicarboxylic acids such as maleic, fumaric, citraconic, gammic, gamma-dimethyl citraconic, mezaconic, itaconic, alpha methyl itaconic, gamma-methyl itaconic, tetraconic, and the like as well as mixtures thereof, but minor amounts of alpha,beta-ethylenically unsaturated polycarboxylic acids containing three or more carboxylic groups such as aconitic acid and the like together with the dicarboxylic acids are also useful.

Whenever available, the anhydrides of any of the aforementioned alpha,beta-ethylenically unsaturated polycarboxylic acids may be substituted for the acid. In addition, suitable saturated acids of their anhydride when available which may also be incorporated along with the unsaturated polyesters include, for example, phthalic acid or anhydride, isophthalic acid, terephthalic acid, tetrabromophthalic acid, tetrachlorophthalic acid, adipic acid, sebacic acid, glutaric acid, or pamelic acid or mixtures thereof. Of particular interest may be mentioned a mixture of isophthalic or orthophthalic acid and fumaric/maleic acids.

Any of a large number of ethylenically unsaturated or saturated polyhydric alcohols may be employed with any of the above suitable mixtures. Dihydric alcohols and especially saturated aliphatic diols are preferred as coreactants in the preparation of polyester resins. Among the dihydric alcohols which may be employed are saturated aliphatic diols such as ethylene glycol, propylene glycol, butylene glycol, diethylene glycol, dipropylene glycol, triethylene glycol, tetraethylene glycol, butane diol, pentane diol, hexane diol, neopentyl glycol and the like as well as mixtures thereof. Among the polyols having more than two hydroxyl groups which may be employed in minor amounts to form branch chains are saturated aliphatic polyols such as glycerol, trimethylolethane, trimethylolpropane, pentaerythritol, arabitol, xylitol, delcitol, donnitol, sorbitol, mannitol and the like as well as mixtures thereof. In addition, aliphatic aromatic diols and polyols may be employed as well as halogenated and alkoxylated derivatives thereof.

In most instances, the condensation products contain unreacted carboxylic acid or hydroxyl groups at the ends of the chain branches. In the present invention the active hydrogens remaining on the hydroxyl or carboxylic acid group may be removed by neutralization with monohydroxy or monocarboxylic acid materials, but such precautions are not considered necessary to prevent cross-linking to the thickener chain.

Other ethylenically unsaturated materials may be added along with the polyester resins such as vinyl ester urethane resins as disclosed in U.S. Pat. Nos. 3,876,726; 3,297,745; 3,371,056; 3,509,234; 3,641,199; 3,642,943; and 3,677,920, to name a few. These polyurethanes must be substantially free of unreacted -NCO groups as to preclude the formation of urylene cross-links.

The ethylenically unsaturated polyester may also include typical ethylenically polyepoxy condensation products which are condensation polyethers produced as, for example, those formed from epichlorohydrin and diols such as bisphenol A, and their ethylenically unsaturated condensation products. Epoxidized polybutadienes are also useful.

The ethylenically unsaturated polymer material may also contain polyisocyanurates such as poly(1,3,5-tri-R substituted S-triazine-2,4,6 trione) wherein the R group may contain ethylenic unsaturation or groups reactive with ethylenically unsaturated materials. R groups may also be linked with epoxy, polyurethane and polyester resins. Such isocyanurates are represented by U.S. Pat. Nos. 2,952,665; 3,041,313; 3,821,098; 3,850,770; 3,719,638; 3,437,500; 3,947,736; and 3,762,269.

In the preparation of the diisocyanate terminated saturated polyester resin, every attempt should be made to prepare an essentially linear resin by reacting a diisocyanate with a polyester diol having a molecular weight ranging from 500–3000. However, suitable results can be obtained if the resin is maintained at at least 85 and in some instances 70 percent linear; that is, the diisocyanates, diols and dicarboxylic acids or anhydrides free of ethylenic unsaturation must contain at least a 70 mol percent total of the difunctional monomers and preferably 85–100 percent.

The —NCO terminated polyester/polyurethane may be prepared by first forming a dihydroxy polyester material by reacting together a dicarboxylic acid or anhydride and a dihydroxy compound free of ethylenic unsaturation in proportions such that the mol ratio of the dihydroxy component to the dicarboxylic acid is controlled to insure that the polyester chain terminates in a hydroxyl group at each end. These materials may be prepared by conventional techniques wherein a mixture of the acids and polyols is heated at temperatures in the range of 100°–200° C. and, if necessary, in vacuo for the removal of the by-product water. Such a reaction can often be carried out neat or through the use of a compatible non-reactive solvent such as one of the above-described ethylenically unsaturated vinylidene monomers.

These diols are thereafter reacted with diisocyanates as, for example, aromatic polyisocyanates such as 2,4- and 2,6-toluene diisocyanate and mixtures thereof; 4,4'-diphenyl methane diisocyanate, diphenyl dimethyl methane-4,4'-diisocyanate, naphthalene-1,5-diisocyanate, polymethylene polyphenyl isocyanate, cycloaliphatics such as cyclohexane-1,4-diisocyanate, aliphatics such as tetramethylene-1,4-diisocyanate, and hexamethylene-1,6-diisocyanate and the like. Mixtures with higher polyisocyanates must be limited to a total functionality of no greater than about 2.7 —NCO/mol and preferably less than 2.3 —NCO/mol.

These materials may be condensed with the polyester diol at temperatures in the range of 50°–100° C. in the absence of conventional urethane catalysts, but typical tin salts or tertiary amines can be employed where needed. The reaction is preferably carried out in such vinylidene monomers such that 40–80 percent polyester/polyurethane resin solids condensations are obtained.

Aliphatic, cycloaliphatic and aromatic diamines free of ethylenic unsaturation are used for chain extending the isocyanate terminated polyester/polyurethane homogeneous solution. In the process of the invention these diamines are added usually after a vinylidene monomer solution has been established with the isocyanate terminated polyester/polyurethane thickener. However, the diamines may be incorporated with solution containing vinylidene polymer and monomer before addition to the isocyanate terminated polyester/polyurethane thickener system. The polyamines used must be at least 90 mol percent of the diamine to limit cross-linking as much as possible.

Aryl diamines and mixtures thereof such as metaphenylene diamine, paraphenylene diamine, naphthalene diamine, benzidine, bis(4-amino-phenyl)methane, 4,4'-diaminodibenzyl, di(para-aminophenyl)ether, 3,3'-diaminodiphenyl sulfone, 4,4'-diaminodiphenyl sulfone and halogenated derivatives such as those containing halogen on the benzenoid ring such as 3,3'-dichlorobenzidine, bis,4-amino-2-chlorophenyl(propane), bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl)methane, hydrogenated methylene dianiline, diamino menthane, and hydrogenated toluene diamine. The most useful of these are those that are liquids up to 75° C. For those which are solids under these conditions, vinylidene monomer solutions can be employed to form the homogeneous mix rapidly.

For best results a homogeneous mixture containing the vinylidene monomer solution of the ethylenically unsaturated resins and the isocyanate terminated saturated polyester resins is prepared by mixing them at room temperature, although elevated temperatures may be employed if necessary. With continued vigorous agitation the diamine is added to bring about the thickening reaction. Depending upon the concentrations and the reactivity of the diamines added thereto, the solution can be gelled within a period as short as one minute and as long as 24 hours. In the most rapid gelling system the fillers should be added prior to the addition of the diamine. In the case of the slower reactants and wherein the vinylidene monomer solution remains fluid over an extended period of time, the filler materials may be added after the diamine addition. The reaction of the diamine with the diisocyanate terminated saturated polyester thickener resin is the controlling feature of the gelation. It has been found that practically no reaction takes place between the isocyanate and the reactive hydrogens which may be present on the ethylenically unsaturated polyester material at temperatures below 80°–100° C. In the practice of the invention, however, there is very little need for raising the temperature of the polyester solution because in most instances the urylating reaction between primary amines and the isocyanate group is much more rapid under any set of conditions than that between the isocyanate and the hydroxyl hydrogen. An added advantage for useing the urylene-linked polyester/polyurethane resin thickener is that no catalyst is needed to carry out or speed up the urylating reaction step. Therefore, the reaction can be carried out to form a gel such that cross-linking does not take place between the polyester urethane/urea chain and the ethylenically unsaturated resin chain incorporated with the vinylidene monomer solution. Furthermore, it has been found that the temperature at which the formation of the gel thickener takes place has little influence on the properties of the resultant gel-thickened material provided that the gel is formed at temperatures below 100° C. or thereabouts.

By selection of suitable catalysts and temperatures, the polymerization of the gelled vinylidene monomer solution may be carried out in several sequences. For example, the isocyanate terminated polyester precursor may be fully reacted with the diamine prior to any substantial reaction between the ethylenically unsaturated polyester and the vinyl monomer. Alternatively, the ethylenically unsaturated polyester may be partially reacted with the vinyl monomer before any substantial reaction between the diamine and isocyanate precursors has taken place. Furthermore, conditions may be regulated such that the isocyanate/diamine reaction takes place at the same time as the reaction of the ethylenically unsaturated polyester with the vinyl monomer.

The reaction between the ethylenically unsaturated polyester and the vinyl monomer is usually activated by the presence of a catalyst, for example, a peroxide like benzoyl peroxide, cyclohexanone peroxide, ditertiary butyl peroxide, dicumyl peroxide and tertiary butyl perbenzoate. Some of these catalysts react at low temperatures to initiate free radicals while others are activated at higher temperatures or by the presence of an accelerator such as a dilute solution of cobalt soap or an amine accelerator. The selection of the free radical initiator catalyst is important if one is to control the time at which the vinylidene monomer polymerization takes place. Inhibitors are sometimes used to prevent premature action by the catalyst. In the performance of the present invention it is preferred that the polyvinylidene polymerization take place within the mold at the temperature of the mold.

Suitable shaping methods include casting and compression molding. For example, a shaped article may be produced by charging the components of the mixture into a suitable mold in which they are first gel polymerized to form what is often referred to as a preform. The mixture may also be compressed during gel polymerization.

It has been found that the initially shaped gel or preform of the invention may also be further shaped when the components of the mixture are in a partially gelled polymerized state which comprises first, forming a tractable shape of simple profile formed before the system becomes completely gel polymerized or before or while the ethylenically unsaturated vinylidene monomer/polyester resin polymerization begins as previously described; and causing or allowing the thus preshaped gel to retain its shape while completing the gelation and vinyl polymerization.

The preshaping process of the invention may be effected on any suitably shaped, partially gel polymerized form of simple profile which may, if desired, contain fibrous reinforcement. It can also be adapted to the preshaping of a partially gel polymerized article in the form of sheet or pellets. The preshaping may be effected, for example, by causing the preform of simple profile to form to the contours of a mold, for example, by mechanical or vacuum means, or by a combination thereof. The shaped article of simple profile, that is, a sheet, may be shaped for example by pressing between the cooperating parts of a mold or by draping over a vacuum molding device.

In many instances a preshaped or preformed article may be removed from the mold after the diamine/diisocyanate reaction has taken place and before the vinyl polymerization has substantially begun. If the gel polymerized article does not retain its shape, the vinyl polymerization may be started while the article is in the preform mold to increase its rigidity and thereafter the article can be removed from the preform mold and injected quickly into another mold thereby retaining a final shape while polymerization reactions are going to completion. Furthermore, the original liquid monomer solution may be thickened by the resultant effect of the diamine addition reaction to form urylene links and the vinyl polymerization such that thickening takes place as a result of two independent and separate polymer type formations. Thus, where the mixture contains only a low concentration of the urylene linked diisocyanate resin it may be desirable to react the ethylenically unsaturated polyester/vinyl monomer partially or almost completely before effecting further shaping or molding. On the other hand, where the mixture comprises a large proportion of the urylene linked polyester/polyurethane it may not be necessary to complete the reaction between the vinyl monomer and the ethylenically unsaturated polyester before effecting the molding or casting operation. The composition should, of course, not be gel polymerized or thickened to intractability as to prevent the further shaping of the vinylidene monomer solution. Reaction conditions must be established by experimental trial with catalyst, resin ingredients, fillers and internal mold release agents and coupling agents well known to the art.

The properties of the shaped articles of the invention, such as the flexural properties and the notched impact strength, are improved by incorporating fibrous reinforcing materials either prior to or after gelation and before the vinylidene monomer solution has been completely polymerized. The fibrous material may be, for example, glass fiber, graphite fiber, asbestos fiber, or fibrous material derived from an organic polymer, for example, polyester, polyethylene terephthalate or a polyamide such as hexamethylene adipimide, or a polyamide derived by polymerization of caprolactam or the corresponding amino carboxylic acid. These fibrous materials may be in any suitable form, for example, in the form of cloth, a matte, ribbon, tapes, continuous fibers or as chopped fiber staple. Furthermore, they may range in length from fibrids to 1–1.5 inches.

The amount of fibrous material to be incorporated will depend upon the desired improvement in the particular property of the shaped article which is of interest. In general, from 5–80 percent of fibrous material of the total weight of the fiber reinforced shaped article will be sufficient. Where it is desirable to effect a substantial improvement of strength properties, 60–80 percent by weight of fibrous material is required.

In addition to the fibrous materials, other fillers such as carbon black, clay, iron oxide, lithopone, mica, siliceous materials, titanium dioxide and colored pigments may be added at some convenient time during the intermixing and preparation of the gelation precursors.

The invention can be understood by the illustrations in the following examples in which all parts are expressed as parts by weight:

EXAMPLE A

Preparation of Isocyanate Terminated Polyester Resin Prepolymer Solutions

The following general procedure can be employed as a guide in preparing linear saturated polyester resins from a polyester diol and a diisocyanate. Ratios of ingredients will vary to match the stoichiometry required. Ingredients are defined in Table I.

The following is specific to Formula A:

1200 parts of a hydroxyl terminated polyester resin of Formula A prepolymerized according to standard procedures is charged to a reaction vessel equipped with a stirrer, thermometer and a condenser. Under stirring, the polyester diol is heated to 100° and a vacuum is applied for 1 hour to dehydrate the polyester. The diol is cooled to 80° C. and 1439.3 parts of styrene is added. When the mixture is homogeneous, 239.31 parts of toluene diisocyanate is added The mixture is allowed to exotherm and then held for 3 hours at 80° C. at which time the mixture is analyzed to determine the proportion of unreacted isocyanate. The isocyanate terminated prepolymer is then cooled to room temperature and 1.03 parts of dibenzoyl chloride is added as a stabilizer. The prepolymer can then be stored under nitrogen for further use.

Formulas B–F are prepared as above using appropriate stoichiometric proportions.

TABLE I-continued

—NCO Terminated Saturated Polyester Resins as 50% Styrene Solutions
Polyester Diol/Diisocyanate Mol Ratio = ½

| For-mula | Polyester Diol | Mols | Diisocyanate |
|---|---|---|---|
|  | Diethylene Glycol | 1.127 |  |
|  | Mol Wt. = 2000 |  |  |
| E | Adipic Acid | 1.0 | " |
|  | Hexamethylene Glycol | 1.127 |  |
|  | Mol Wt. = 2000 |  |  |
| F | Adipic Acid | 1.0 | Crude Diphenyl- |
|  | Ethylene Glycol | .99 | methane Diiso- |
|  | Diethylene Glycol | .056 | cyanate (2.3 -NCO |
|  | Monoethanol Amine | 0.6 | Groups/Mol) |

TABLE II

Unsaturated Polyester Resins/Vinylidene Monomer Solutions as 50% Solutions in Styrene

| Formula | Polyester Resin | | |
|---|---|---|---|
| G | $\left[[H_2C=C(CH_3)\overset{O}{\overset{\|}{C}}O-]_2 \left[CH_2CH-CH_2-O-\!\langle\!\!\bigcirc\!\!\rangle-\right]_2C-(CH_3)_2\right]_x$ where X is at least 1 | | |
|  |  | | |
|  | | $\overset{\|}{OH}$ | |
| H | 2.2 - Propoxylated Bisphenol A | 1.0 Mol | |
|  | Fumaric Acid | 1.0 Mol | |
| I | 2.2 - Propoxylated Tetrabromo | 1.0 Mol | |
|  | Bisphenol A | | |
|  | Maleic Acid/Fumaric Acid | 1.03 Mol | |
|  | (Wt. Ratio = 1/7) | | |
| J | [HPMA—TDI—PBPA]₂MA | | |
|  | HPMA - hydroxy propyl methacrylate | 2 Mols | |
|  | TDI - toluene diisocyanate | 2 Mols | |
|  | PBPA - 2.2-propoxylated Bisphenol A | 2 Mols | |
|  | MA - Maleic anhydride | 1 Mol | |

The resins of Table II are prepared according to well known techniques and are commercially available.

For example, Formula G is prepared by condensing 1 mol of a polyglycidyl ether of bisphenol A with 2 mols of methacrylic acid.

Formulas H and I as previously described.

Formula J is formed by condensing di(2.2 propoxylated bisphenol A)maleate with 2 mols of toluene diisocyanate and thereafter with 2 mols of hydroxy propyl methacrylate.

Alternate equivalents to Formula J are made by substituting the previously described unsaturated dicarboxylic acids for maleic acid; the previously described diols for bisphenol A and included are their reaction products with from 1–20 mols of ethylene or propylene oxide; the previously described diisocyanates for toluene diisocyanate; and ethylenically unsaturated hydroxy monomers for the hydroxy propyl methacrylates.

TABLE I

—NCO Terminated Saturated Polyester Resins as 50% Styrene Solutions
Polyester Diol/Diisocyanate Mol Ratio = ½

| For-mula | Polyester Diol | Mols | Diisocyanate |
|---|---|---|---|
| A | Adipic Acid | 1.0 | Toluene |
|  | Ethylene Glycol | .99 | Diisocyanate |
|  | Diethylene Glycol | .056 |  |
|  | Monoethanol Amine | .06 |  |
|  | Mol Wt. = 1745; | AN = <3 |  |
| B | Isophthalic Acid | 0.3 | " |
|  | Adipic Acid | 0.7 |  |
|  | Hexamethylene Glycol | 1.127 |  |
|  | Mol Wt. = 2040 |  |  |
| C | Adipic Acid | 1.0 | " |
|  | Ethylene Glycol | 1.127 |  |
|  | Mol Wt. = 2000 |  |  |
| D | Adipic Acid | 1.0 | " |

The following Examples refer to the formulations previously described in Table I and Table II:

EXAMPLE 1

80 parts of Formula J, Table II, were mixed with 20 parts of Formula A, Table I, and then mixed under high speed mixing with 1.04 parts of isophorone diamine. Within 4 minutes time the viscosity was in excess of 100,000 centipoise and a tack-free homogeneous gel was obtained within minutes thereafter.

EXAMPLE 2

70 parts of Formula G (containing 1 percent cobalt naphthenate solution as catalyst promoter), Table II, were mixed with 30 parts of Formula A, Table I, in the presence of 1 part of a dimethyl phthalate solution containing 60 percent methyl ethyl ketone peroxide, a free radical catalyst, 0.1 part of a 10 percent solution of tertiary butyl catechol inhibitor and reacted with 1.57 parts of isophorone diamine. Within 5 minutes a highly viscous clear gel, dry to the touch, was formed and within 1 hour thereafter, the mixture cured to a tough, solid plastic at room temperature.

EXAMPLE 3

100 parts of Formula H, Table II, and 30 parts of Formula A, Table I, were mixed and then reacted with 1.04 parts trimethyl hexamethylene diamine. A gel was obtained in about 25 minutes.

EXAMPLE 4

2700 parts of Formula J, Table II, 495 parts of Formula A, Table I, 1.78 parts of hydroquinone, an inhibitor, 40.5 parts of a 50 percent tertiary butyl peroctoate in dioctyl phthalate free radical initiator catalyst, and 10 parts of a commercially available release agent Zelex NE ® were thoroughly mixed in a Cowles Mixer and then thickened under mixing with a blend of 6.83 parts of isophorone diamine and 19.08 parts of trimethyl hexamethylene diamine.

Equal parts of the above mixture were fed into the two doctor blades of a commercially available moving belt type sheet casting machine operating at 12 ft./min. The resin was poured over chopped 1-inch long presized fiber glass roving contained on a layer of polypropylene film on the conveyor belt, and thereafter cast along with additional fiber glass between another sheet of polypropylene film which passed through reduction rollers forming a compact flat reinforced resin sheet containing 65 percent glass. The sheet molding resin polypropylene film sandwich was rolled and stored. The thickened gel exhibited excellent adherence to the glass.

To demonstrate the molding capability of the sheet molding composition, four 9-inch squares were cut from the large rolls after removal of the polypropylene film from each side, stacked on top of each other, and placed at the center of an 11-inch square mold. The total weight of the four 9×9 inch squares was 503 grams. The four 9×9 inch squares were compressed at 810 lbs./sq. inch pressure for 5 minutes at 125° C. The fully cured 11×11 inch laminate demonstrated excellent flow-out as evidenced by even "flash" on all four sides of the mold. Physical properties for the laminate were as follows: flexural strength, 61,400 psi (ASTM D-790); flexural modulus, $1.86 \times 10^6$ psi; Barcol hardness, 49–54 (ASTM D 2583); glass content, 63.63%; notched Izod impact, 22.7; tensile strength, 38,900 psi (ASTM D 638); tensile modulus, $1.9 \times 10^6$ psi; and elongation, 2.34%.

EXAMPLE 5

To demonstrate the formation of bulk molding compound, 510 parts of Formula J, Table II, 90 parts of Formula A, Table I, 9 parts peroxide catalyst (Trigonox 21-OP-50) is thoroughly mixed and then thickened with rapid stirring by the addition of 4.71 parts isophorone diamine. This material was then poured into the feed hopper of a cutting machine manufactured by I. E. Brenner Corp., of Newark, Ohio, U.S.A. Into the machine is also fed continuous presized fiber glass roving manufactured by PPG Industries as PPG-518. The resin wet glass fibers then pass through a Teflon ® mold onto a carrying roll and from there into a cutting wheel. By adjusting the roller speed, impregnated chopped glass filled resin is obtained with a glass content of 65%. The 1-inch long impregnated glass pieces are collected in a plastic bag and stored. Within 30 minutes the bulk molding compound matures to a rubbery, tack-free composition.

500 grams of this material is then placed into an 11-inch square mold and molded at room temperature at 810 psi for 5 minutes into a rubbery pliable preform. The preform had the shape of the mold dimensions and showed good glass transport and flow-out.

After 5 days the preform was cut into 4 equal squares which were stacked together and then placed in the center of an 11-inch square mold. A laminate was prepared by molding the cut premold for 5 minutes at 125° C. and 405 psi. An excellent flowout was obtained with even glass distribution.

EXAMPLE 6

300 parts Formula J, Table II; 54.96 parts Formula A, Table I; 4.75 parts Trigonox 21-OP-50 catalyst; and 2.88 parts of a 75/25 trimethyl hexamethylene diamine/isophorone diamine blend calculated on an equivalent weight basis of the diamines were mixed. After degasing the mixture was poured into a glass mold and cured in an oven at 150° C. for 1 hour. After cooling an opaque casting resulted having the following physical properties: flexural strength, 13,000 psi break; flexural modulus, $0.33 \times 10^6$ psi; Barcol hardness, 17–23; tensile strength, 8,200 psi yield; tensile strength, 8,000 psi break; 10 percent elongation; notched Izod, no break.

EXAMPLE 7

231 parts Formula J, Table II, 69 parts Formula B, Table I, 1.2 parts cobalt naphthanate, 0.6 parts dimethyl aniline, 0.6 parts tertiary butyl catechol, 3 parts methyl ethyl ketone peroxide 60 percent in dimethyl phthalate solution, and 2.43 parts isophorone diamine were thoroughly mixed and poured into a glass mold, cured at room temperature for 24 hours and post-cured for 4 hours at 100° C. The molded article remained as a tough, clear casting having the following physical properties: flexural strength, 16,500 psi yield; flexural strength, 11,800 psi break; flexural modulus, $0.42 \times 10^6$ psi; Barcol hardness, 23–28; tensile strength, 10,200 psi yield; tensile strength, 9,200 psi break; 8.96 percent elongation; notched Izod, 10.2.

EXAMPLE 8

150 parts of Formula B, Table I, 175.58 parts styrene, 526.74 parts Formula J, Table II, were thoroughly mixed with 25.58 parts toluene diisocyanate. An additional 5.3 parts toluene diisocyanate were added to account for the water contaminating Formula J. The mixture was heated to 80° C. for several hours. Reaction was terminated when the —NCO content was 0.82 percent (0.7 percent theoretical). The mixture was stored under nitrogen.

To 300 parts of this mixture is added 0.6 parts dimethyl aniline, 1.2 parts cobalt naphthenate, 3 parts methyl ethyl ketone peroxide, as a 60 percent solution in dimethyl phthalate, 0.3 parts 10 percent solution of tertiary butyl catechol and 3 parts isophorone diamine. A touch, clear plastic casting was prepared having properties similar to that described for Example 7.

EXAMPLE 9

Tough, clear castings are prepared as described for Example 3 when the polyester resin of Formula I, Table II is substituted for Formula H, Table II.

EXAMPLES 10–20

To demonstrate the excellent physical properties obtained for castings containing no filler which were made according to procedures similar to that described for Examples 1–3 and 6–9, various resin compositions are presented in Table III.

EXAMPLES 21–23

To demonstrate the excellent physical properties exhibited by glass reinforced moldings prepared according to a process similar to that used in Example 5, three compositions are presented with their physical properties in Table IV.

EXAMPLES 24 & 25

To demonstrate the relatively excellent lack of shrinkage exhibited by 65 percent glass filled resin compositions previously described, several tests were conducted according to the procedures set out in ASTM-D 955-73. In this test the dimensions of a flat sheet mold are determined at room temperature. The material is molded under standard conditions of temperature and mils per inch. See "Low Shrink Polyester Resins, Performance and Application"; C. H. Croekel and E. J. Bartkus, Section 18E, 23d SPI Technical Conference, Feb., 1968.

TABLE III

Physical Properties of Unfilled Casting

| Ex. No. | Thickener NCO Term. Prepolymer Formula/ Diamine | Unsaturated Polyester Table II Formula | Weight % Thickener in Resin Mix | Flexural Strength psi | Flexural Modulus psi $\times 10^6$ | Tensile Strength psi | Tensile Modulus psi $\times 10^6$ | E-long. % | Barcol Hard. (ASTM D2583) | Charpy Impact (ASTM D256) U=Unnotched N=Notched | Heat Deflection Temp.° C (ASTM D648) at 264 psi |
|---|---|---|---|---|---|---|---|---|---|---|---|
| 10 | A/IPD | J | 11.5 | 16,600 | 0.41 | 10,400 | 0.43 | 9.5 | 25–28 | 11.8 U | 94 |
| 11 | A/25% IPD* 75% TMD** | J | 11.6 | 13,000 | 0.33 | 8,200 | 0.37 | 10 | 17–23 | .62 N | 100.5 |
| 12 | B/IPD | H | 13.0 | 11,900 | 0.30 | 7,200 | 0.30 | 4.0 | — | 7.1 U | 92 |
| 13 | F/IPD | J | 5.0 | 16,800 | 0.44 | 11,000 | 0.41 | 3.7 | 8–10 | 7.5 U | 105.5 |
| 14 | C/IPD | J | 7.5 | 15,900 | 0.40 | 9,200 | 0.34 | 4.16 | 21–26 | 0.64 N | 112 |
| 15 | C/IPD | J | 10.0 | 14,600 | 0.36 | 8,500 | 0.32 | 4.89 | 17–18 | 0.67 N | 107.5 |
| 16 | C/IPD | J | 11.5 | 13,900 | 0.34 | 7,900 | 0.28 | 5.81 | 17–18 | 0.67 N | 107 |
| 17 | D/IPD | J | 11.5 | 14,300 | .38 | 9,300 | .38 | 4.75 | 0–3 | 9.55 U | 106 |
| 18 | D/IPD | J | 12.5 | 14,300 | .37 | 8,900 | .35 | 4.69 | 0 | 13.8 U | 104 |
| 19 | E/IPD | J | 7.5 | 15,900 | .41 | 9,800 | .42 | 5.00 | 0–6 | 9.1 U | 107.5 |
| 20 | E/IPD | J | 11.5 | 13,100 | .34 | 8,100 | .34 | 4.76 | 0 | 11.7 U | 103.5 |

*Isophorone diamine
**Trimethyl hexamethylene diamine

TABLE IV

Physical Properties of Fiber Glass Reinforced Moldings

| Ex. No. | Thickener —NCO Prepolymer Table I Formula/ Diamine | Unsaturated POlyester Table II Formula | Weight % Thickener In Resin Mix | % By Weight Fiber Glass | Flexural Strength psi | Flexural Modulus psi $\times 10^6$ | Tensile Strength psi | Tensile Modulus psi $\times 10^6$ | Elong. % | Barcol Hard. (ASTM D-2583) | Izod Impact |
|---|---|---|---|---|---|---|---|---|---|---|---|
| 21 | A/IPD | J | 11 | 69.50 | 52,600 | 2.04 | 37,500 | 2.10 | 1.99 | 55–60 | 27.32 |
| 22 | A/IPD | J | 15 | 70.30 | 45,800 | 2.00 | 32,800 | 2.07 | 1.79 | 38–45 | 33.78 |
| 23 | F/IPD | J | 6 | 69.17 | 45,000 | 2.26 | 38,500 | 2.53 | 1.81 | 53–61 | 29.17 |

TABLE V

Shrinkage Properties of 65% Fiber Glass Reinforced Resins

| Example No. | Thickener —NCO Prepolymer Table I Formula/ Diamine | Unsaturated Polyester Table II Formula | Weight % Thickener In Resin Mix | Shrinkage Sections A | B | C | D | E | F | Average |
|---|---|---|---|---|---|---|---|---|---|---|
| 24 | F/IPD | J | 6 | .184 | .364 | .363 | .182 | .454 | .545 | .348 |
| 25 | A/IPD | J | 15 | .182 | .273 | .363 | −.182 | .364 | .364 | .227 | pressure after which the molded article is permitted to cool and equilibrate at the temperature at which the mold was measured originally. The plaques are then measured in the same dimensions as the mold and the shrinkage is calculated according to the following formula:

$$(M-T)/M = S$$

wherein:
S = shrinkage expressed in mils/inch;
M = dimension of mold; and
P = dimension of plaque.

In Table V are shown the measurements of a square, flat sheet measured face down over its longest dimensions. The sections are as follows:
A - left side, top to bottom;
B - center, top to bottom;
C - right side, top to bottom;
D - top edge, left to right;
E - center, left to right; and
F - bottom, left to right.

By comparison, conventional molding resins such as one containing 30 percent resin, 30 percent filler and 30 percent glass with no other additives, shrink about 3–4

EXAMPLE 26

To demonstrate the excellent distribution characteristics in a flat sheet mold, 78 parts of Formula A, 22 parts Formula J, 0.66 parts 10 percent hydroquinone solution, 0.9 parts zinc stearate, 1.5 parts tertiary butyl peroctoate solution, and 0.78 parts isophorone diamine were intimately mixed and processed as described in Example 4 to form a 70 percent 1-inch fiber glass filled thickened resin. 24 hours later the sheet was cut into a strip 5-½ inches wide, weighing 650 grams. The sheet was folded accordian style to form an overlap 5-½ inch square stack which was thereafter placed in an 11-inch square mold. The 5-½ inch square stack was placed at a position even with the edge of one side of the mold and centrally spaced. The platen was lowered to force the stack out through the 11-inch square dimensions in a direction forward and sideways such that the flow-out at each side amounts to 50 percent and forward about 100 percent. The plaque was made by molding at 125° C. at a pressure of 405 lbs./sq. inch for 5 minutes. Sections were then cut from the 11-inch square sheet and were labeled as follows: looking face down on the 11-inch square and considering the upper edge as the edge adjacent the originally placed 5-½ square charge stack, the analysis for each section as described can be found in Table VI:
- A - left corner adjacent original charge;
- B - left center edge section;
- C - left bottom corner section;
- D - top edge center section;
- E - mid-center section;
- F - bottom edge center section;
- G - right edge corner section adjacent original charge;
- H - right edge center section; and
- I - right bottom corner edge section.

TABLE VI

| | Thickener —NCO Prepolymer Table I | Unsaturated Polyester Table II | Weight % Thickener In Resin | Flow-Out Properties of 70% Glass | | | | | | | | |
|---|---|---|---|---|---|---|---|---|---|---|---|---|
| | | | | % Glass in Distribution Sections | | | | | | | | |
| Example No. | Formula/ Diamine | Formula | Mix | A | B | C | D | E | F | G | H | I |
| 26 | A/IPD | J | 11 | 69.13 | 71.56 | 72.12 | 68.79 | 72.31 | 70.65 | 71.40 | 71.73 | 71.58 |
| 27 | B/IPD | J | 11 | 63.5 | 57.9 | 59.4 | 60.3 | 61.6 | 62.5 | | | |
| 28 | B/IPD | H | 13.5 | 59.0 | 57.7 | 57.8 | 58.6 | 55.2 | 58.9 | | | |

EXAMPLES 27 & 28

To demonstrate the excellent flow characteristics of two gelled compositions of the invention made according to Examples 4 and 5 having compositions as shown in Table VI, a 15 pound preform containing approximately 60 percent 1-inch fiber glass roving with dimensions 3×15 inches in diameter was compression molded into a circumferential ring having a T-shaped cross section. The cross section of the T-shaped conduit had an inside diameter varying from ⅜ inch - ½ inch in thickness. The T-shaped cross section had a 7-inch cross branch with an adjoining 7-½ inch long branch intercepting at the mid-section of the cross branch. The preform was forced into one end of the 7-inch cross branch. After molding and curing the molded ring was cut into a T-shape cross section and analyzed. The analysis for each section as described below can be found in Table VI:
- A - the portion 10 inches from the injection point and at the end of the longest branch of the T;
- B - a portion from the longest branch of the T approximately 7 inches from the point of injection;
- C - a section from the longest branch near the intercept and approximately 5 inches from the point of injection;
- D - a section from the point of injection taken from the short cross branch;
- E - a portion from the short cross branch at a point 5 inches from the point of injection; and
- F - a portion of the short cross branch at a point 7 inches from the point of injection.

The distribution in the rim was fairly uniform circumferentially and was within suitable limits for uniformity and strength.

EXAMPLE 29

According to Example 1 the following composition is prepared containing 87.3 parts styrene, 9.7 parts hydroxy propyl methacrylate, 14.3 parts Formula A having 70 percent solids in styrene, and thickened by the addition of .75 parts isophorone diamine. The mixture forms a clear, homogeneous solution and gels to form a transclucent thixotropic gel within 5 minutes and a rubbery non-tacky gel within 10 minutes. A similar composition when made in the presence of a catalyst activator can be cured at temperatures above 100° C. to form unfilled resins having physical properties similar to those previously described.

EXAMPLE 30

78.05 parts styrene, 9.15 parts hydroxy propyl methacrylate, 21.45 parts Formula A, Table I, as 70 percent solids in styrene solution, is intermixed according to Example 1 and thickened by the addition of 1.12 parts isophorone diamine. Within 5 minutes the clear, homogeneous solution converts to a rubbery non-tacky gel. Formulations prepared containing free radical catalyst initiators can be expected to form completely cured resins having physical properties similar to that previously described.

What is claimed is:

1. A solution comprising a homogeneous mixture having 5-70 percent by weight of a linear polyester urethane urea resin wherein the number of urylene and urethane groups are substantially equal and free of ethylenic unsaturation formed by urylene-linking a linear isocyanate terminated polyester free of ethylenic unsaturation having a molecular weight within the range of 500-3000 and 30-95 percent by weight of an ethylenically unsaturated monomer.

2. A composition of claim 1 wherein said solution additionally comprises up to 50% by weight of an ethylenically unsaturated polyester resin.

3. A composition of claim 1 having a free radical initiator type catalyst.

4. A composition of claim 1 wherein said urylene-linked linear polyester urethane urea is an addition product of an —NCO terminated polyester/polyurethane free of ethylenic unsaturation and an organic polyamine free of ethylenic unsaturation having at least 90 mol percent diamine.

5. A composition of claim 4 wherein said —NCO terminated polyester is a condensation product of a polyester polyol free of ethylenic unsaturation and having at least 70 mol percent polyester diol and a polyisocyanate free of ethylenic unsaturation having at least 70 mol percent diisocyanate in molar quantities of polyol/polyisocyanate of ½.

6. A composition of claim 5 wherein said polyester polyol is an addition product of a dicarboxylic acid free of ethylenic unsaturation and a polyol free of ethylenic unsaturation.

7. A composition of claim 5 wherein said polyester polyol has a molecular weight ranging between 500-3000.

8. A composition of claim 6 wherein said dicarboxylic acid is selected from the group consisting of phthalic, isophthalic acid, terephthalic acid, adipic acid, sebacic acid, glutaric acid and pamelic acid or mixtures thereof.

9. A composition of claim 6 wherein said polyol is selected from the group consisting of ethylene glycol, propylene glycol, butylene glycol, diethylene glycol, dipropylene glycol, triethylene glycol, tetraethylene glycol, butane diol, pentane diol, hexane diol, neopentyl glycol, bisphenol A, as well as halogenated and alkoxylated derivatives thereof.

10. A composition of claim 4 wherein said diamines are selected from the group consisting of ethylene diamine, propylene diamine, hexamethylene diamine, trimethyl hexamethylene diamine, isophorone diamine, 1-amino-3-5,5-trimethylcyclohexane, hydrogenated di(aminophenyl)methane, hydrogenated methylene dianiline, diamino menthane, hydrogenated toluene diamine, metaphenylene diamine, paraphenylene diamine, naphthalene diamine, benzidine,bis(4-amino-phenyl)methane, 4,4'-diaminodibenzyl, di(para-amino-phenyl)ether, 3,3'-diaminodiphenyl sulfone, 4,4'-diaminodiphenyl sulfone, and halogenated derivatives thereof.

11. A composition of claim 4 wherein said diamine is a liquid at a temperature up to 75° C.

12. A composition of claim 2 wherein said ethylenically unsaturated resins comprise ethylenically unsaturated resins having the following general formula wherein X is at least 1:

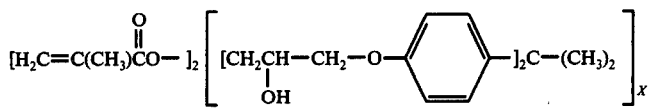

13. A composition of claim 2 wherein said unsaturated polyester resin comprises an ethylenically unsaturated polyurethane.

14. A composition of claim 13 wherein said polyurethane is formed by condensing 2 mols of 1-20 alkoxylated diol with 1 mol of an alpha,beta-ethylenically unsaturated dicarboxylic acid, and thereafter with 2 mols of a diisocyanate derivative free of ethylenic unsaturation and thereafter with 2 mols of an ethylenically unsaturated monomer having an —NCO reactive hydrogen.

15. A composition of claim 2 wherein said ethylenically unsaturated polyester resin includes polyisocyanurate linkages such as poly(1,3,5-tri-R substituted s-triazine-2,4,6-trione) wherein said R groups contain ethylenic unsaturation or groups reactive with ethylenically unsaturated materials.

16. A composition of claim 2 wherein said ethylenically unsaturated polyester resin has a molecular weight ranging from 400–4000.

17. A composition of claim 1 having 5–80 percent by weight filler.

18. A composition of claim 17 wherein said filler ranges from 50–80 percent particulate or fibrous material.

19. A composition of claim 18 wherein said fibrous material is glass.

20. A composition of claim 19 wherein said fibrous glass material is present in lengths up to 1.5 inches.

21. A composition of claim 19 wherein said fibrous glass material has an organic size coating.

22. A composition of claim 1 wherein said ethylenically unsaturated monomer is selected from the group consisting of styrene; vinyl toluene; divinyl benzene; acrylic acid esters and methacrylic acid esters such as methylacrylate ethyl acrylate, N-butyl acrylate, 2-ethyl-hexylacrylate methyl methacrylate, ethylene glycol dimethacrylate; diallyl phthalate; diallyl maleate; diallyl fumarate; triallyl cyanurate; vinyl acetate; vinyl propionate; vinyl ether; acrylonitrile; and pentaerythritol triacrylate.

23. In the process of thickening or gelling an ethylenically unsaturated monomer solution with a polyester/polyurethane resin system the improvement which comprises: mixing an ethylenically unsaturated monomer solution with from 5–70 percent by weight of an —NCO terminated linear polyester/polyurethane resin free of ethylenic unsaturation and thereafter urylene-linking said polyester/polyurethane resin by reacting organic diamines free of ethylenic unsaturation with substantially all the —NCO groups on said —NCO terminated polyester/polyurethane resin.

24. A process according to claim 23 carried out in admixture with an ethylenically unsaturated resin.

25. A process of claim 23 carried in admixture with filler.

26. A process of claim 23 carried out in admixture with a free radical initiator type catalyst.

27. A process of claim 23 carried out at temperatures of 20°–30° C.

28. A process of claim 26 wherein said reaction is carried out at a temperature wherein said catalyst is activated.

29. A process of claim 27 carried out in admixture with a fibrous filler.

* * * * *